United States Patent [19]

Niggemann

[11] Patent Number: 4,598,695
[45] Date of Patent: Jul. 8, 1986

[54] SOLAR BOILER OR ENERGY STORAGE APPARATUS

[75] Inventor: Richard E. Niggemann, Rockford, Ill.

[73] Assignee: Sundstrand Corporation, Rockford, Ill.

[21] Appl. No.: 739,566

[22] Filed: May 30, 1985

[51] Int. Cl.$^4$ .................................................. F24J 2/32
[52] U.S. Cl. .................................... 126/433; 126/417;
126/438; 136/248; 165/104.21
[58] Field of Search ............... 126/433, 434, 430, 436,
126/417, 438, 439; 136/248; 165/104.13,
104.17, 104.19, 104.21, 104.26, 104.33

[56] References Cited

U.S. PATENT DOCUMENTS

| | | | |
|---|---|---|---|
| 1,860,027 | 5/1932 | Raymond | 165/104.19 X |
| 4,073,284 | 2/1978 | Laing | 126/400 X |
| 4,131,158 | 12/1978 | Abhat et al. | 126/436 X |
| 4,251,291 | 2/1981 | Gomez | 126/430 X |
| 4,335,578 | 6/1982 | Osborne et al. | 126/433 X |
| 4,382,437 | 5/1983 | Woods, Jr. et al. | 126/433 |
| 4,384,550 | 5/1983 | Miller | 126/417 X |
| 4,392,007 | 7/1983 | Barkats et al. | 165/104.21 X |
| 4,397,152 | 8/1983 | Smith | 126/430 X |
| 4,419,983 | 12/1983 | Holland | 165/104.19 |
| 4,452,232 | 6/1984 | David | 126/451 X |

Primary Examiner—Larry Jones
Attorney, Agent, or Firm—Wood, Dalton, Phillips, Mason & Rowe

[57] ABSTRACT

Catastrophic failure of a solar boiler or energy storage device adapted for use in space is avoided in a structure including a housing having a generally cylindrical interior wall with a solar energy admitting aperture at one end. A plurality of elongated, axially extending individual heat pipes are disposed in proximity to the wall and are disposed about the periphery thereof while a plurality of circumferentially extending, individual second heat pipes are wrapped about the radially outer surfaces of the axial heat pipes. Heat exchangers are interposed between ones of the circumferential heat pipes. The failure of any single one of the heat pipes is insufficient to cause total failure of the system.

7 Claims, 4 Drawing Figures

SOLAR BOILER OR ENERGY STORAGE APPARATUS

FIELD OF THE INVENTION

This invention relates to a solar boiler or energy storage device, and more particularly, to such an apparatus that employs heat pipes.

BACKGROUND OF THE INVENTION

Of possible relevance to the present invention is U.S. Pat. No. 4,320,246 issued Mar. 16, 1982 to Russell.

Spacecraft and satellites have, for a number of years, employed solar energy receivers of various sorts to power on-board systems while in orbit. However, solar energy receivers by themselves are not a complete solution to the powers need of such systems since in many instances, the orbit of the spacecraft or satellite follows a path that will result in the interposition of the earth between the sun, thereby blocking the solar energy receiver from the source of solar energy.

Therefore, in order to provide power to on-board systems during such a portion of the orbit, some sort of energy storage device is required and the receiver made such as to receive sufficient energy to power on-board systems while illuminated by the sun as well as to provide sufficient energy to an energy storage device as to operate the systems when the receiver is not so illuminated.

Another consideration of considerable concern is the reliability of the system. Because a breakdown in a system in a spacecraft may endanger the mission of the spacecraft and because satellites are not easily retrieved, it is necessary that the systems be highly reliable and not subject to catastrophic failure in the hostile environment of space.

SUMMARY OF THE INVENTION

The present invention is directed to providing a new and improved solar boiler or energy storage device. More specifically, it is an object of the invention to provide a highly reliable solar energy receiver which is essentially isothermal and which includes integral energy storage means.

An exemplary embodiment of the invention achieves the foregoing objects in a solar boiler or energy storage device including a housing having a generally cylindrical interior wall and including a heat receiving means such as a solar energy receiving aperture or a heat exchanger at one end. A plurality of elongated, axially extending, individual first heat pipes are in close proximity to the interior wall and disposed about the periphery thereof. A plurality of circumferentially extending individual second heat pipes are in proximity to the wall over a predetermined axial portion thereof and in heat transfer relation with the first heat pipes and the radially outer side thereof.

At least one circumferentially extending heat exchanger is in heat transfer relation with the first heat pipes at a location axially spaced from the second heat pipes. As a consequence of this construction, an essentially isothermal apparatus is defined as well as one that is not subject to catastrophic failure in that the failure of one heat pipe, while causing some system degradation, will not render the entire system inoperative.

A highly preferred embodiment of the invention contemplates the provision of thermal storage salt cells interposed between at least some of the first heat pipes in heat exchange relation therewith.

In a highly preferred embodiment, the first heat pipes have generally I-shaped cross sections and the salt cells are disposed on opposite sides thereof and between the top and the base thereof in pockets defined by the spaces between the sides of the heat pipes.

The invention also contemplates that the second heat pipes be divided into two axially spaced sets with the heat exchanger being located between the sets.

To maximize thermal efficiency, the individual salt cells have internal, thermally conductive fins.

Other objects and advantages will become apparent from the following specification taken in connection with the accompanying drawings.

DESCRIPTION OF THE PREFERRED EMBODIMENT

Figure 1:
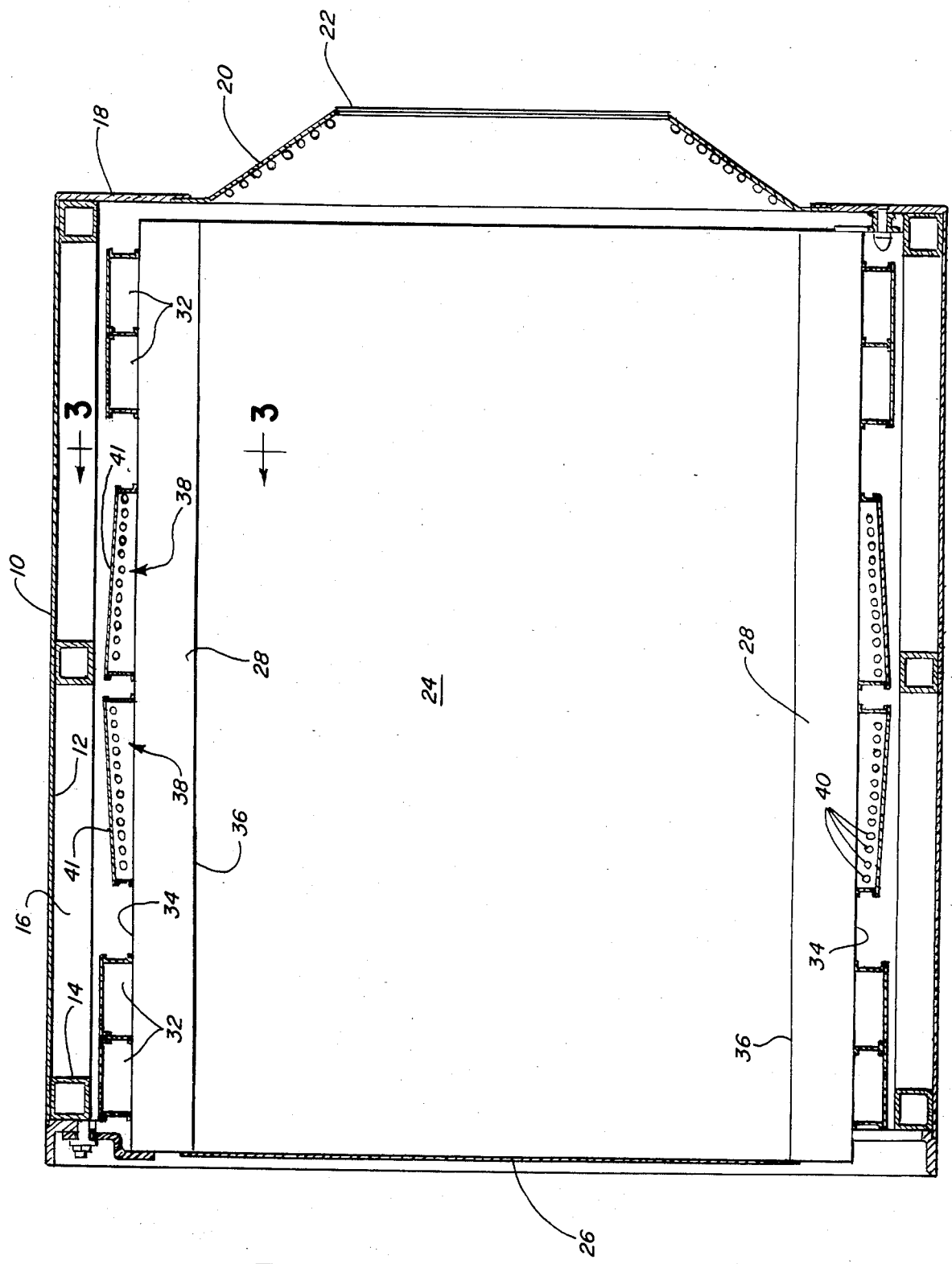
FIG. 1 is a sectional view of a solar boiler and energy storage device made according to the invention.
Figure 2:
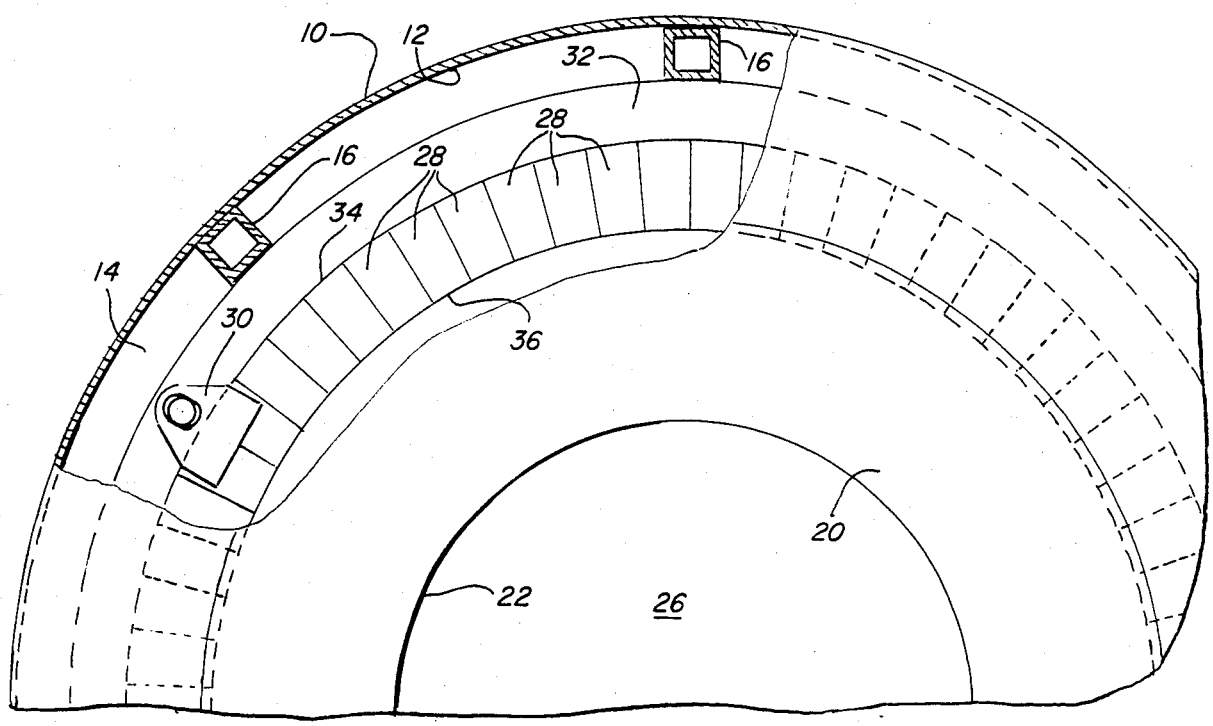
FIG. 2 is a fragmentary side view of the apparatus with parts broken away for clarify.

An exemplary embodiment of a solar boiler and energy storage device is illustrated in the drawings and with reference to FIGS. 1 and 2 is seen to include a housing 10 of generally cylindrical configuration including a cylindrical interior wall 12. The housing 10 is in part supported by an internal cage-like structure made up of tubes 14 having a square cross section which extend generally circumferentially of the housing and like tubes 16 which extend generally axially of the housing 10.

At one end, the housing 10 includes a ring-like plate 18 whose central opening mounts a frusto-conical entrance element 20 having a central opening 22 through which solar energy may enter the interior 24 of the housing 10. The opposite end of the housing 10 is closed as by a plate 26.

The interior wall 12 of the housing 10 is lined with a plurality of elongated, generally axially extending, discrete or individual heat pipes 28 which are in side-by-side abutting relation and held in place by, for example, brackets 30. In a preferred embodiment, the working fluid of the heat pipes 28 is potassium vapor or liquid.

At opposite ends of the housing 10, and interposed between the heat pipes 28 and the tubes 14 and 16, are a plurality of circumferentially extending heat pipes 32. In other words, there are two sets or groups of the heat pipes 32, each having a plurality of the heat pipes.

The heat pipes 32 preferably are potassium heat pipes. As can be seen from FIGS. 1 and 2, the heat pipes 32 are in abutment with and in heat transfer relation to the heat pipes 28 at the radially outer surfaces 34 of the latter.

The radially inner surfaces 36 of the heat pipes 28 receive solar energy entering the housing 10 through the opening 22.

Disposed between the circumferential heat pipes 32 on the radially outer surface of the axial heat pipes 28 are one or more heat exchangers, generally designated 38, in heat exchange relation with the axial heat pipes 28 at the radially outer surfaces 34 thereof. The heat exchangers 38 may be of any desired type but preferably will include tubes 40 in which a heat exchange fluid, such as toluene in the liquid and vapor phases, can be circulated. The tubes 40 are within annular housings 41 on the radially outer surfaces 34 of the heat pipes 28. To establish a good heat transfer relationship, the housings 41 are filled with a metal that will liquify during operation, as for example, potassium. Thus, energy absorbed by the collector can be transferred to the heat exchangers 38 and conveyed by the working fluid contained in the tubes 40 to a point of use. The use of a metal such as potassium has an additional advantage in space application. When the collector is not in use, the metal will solidify thereby providing increased rigidity to the structure which is particularly desirable during launching or reentry of spacecraft due to high vibration levels that typically exist during those phases of flight. The use of potassium also assures that any leakage into the heat pipes 28, which as mentioned, are potassium heat pipes, will not deleteriously affect their operation.

Figure 3:
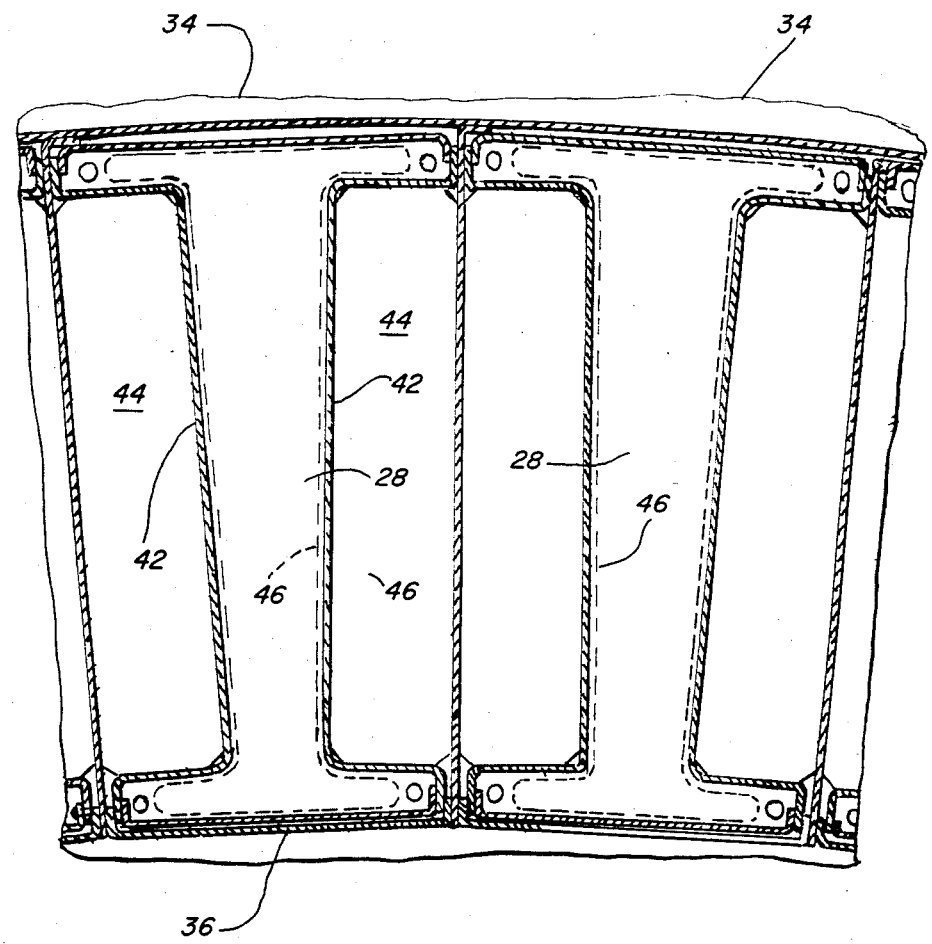
FIG. 3 is an enlarged, fragmentary sectional view taken approximately along the line 3—3 in FIG. 1.

Turning now to FIG. 3, the axial heat pipes 28 are illustrated in detail and each is formed of a discrete or sealed tubular unit having a generally I-shaped cross section. Thus, each has a top defining the radially outer surface 34, a base defining the radially inner surface 36 and opposed sides 42 which define pockets 44. The heat pipes 28 are in side-by-side relationship with their tops and bases in substantially abutting relation as illustrated in FIG. 3 and their interiors include a layer of wicking material 46 which may be conventional. Also within the interior of each heat pipe 28 is a quantity of the working fluid, preferably potassium as mentioned previously. The potassium will exist in a liquid phase generally within the wicking material 46 and in the vapor phase elsewhere within the heat pipe. The heat pipes 32 are likewise provided with interior wicking material (not shown) and a quantity of the working fluid and each is a discrete unit.

Figure 4:
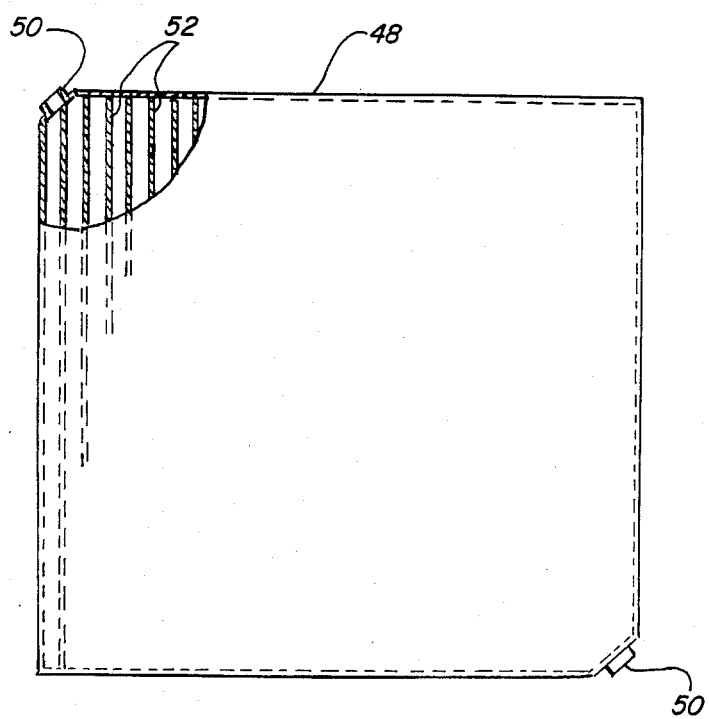
FIG. 4 is an elevational view of a salt storage canister employed in the invention with parts broken away for clarify.

The pockets 44 are adapted to receive salt canisters or cells 48 as illustrated in FIG. 4. Each cell 48 has a cross section corresponding to that of the pocket 44 in which it is to be received and each pocket may receive several of the cells 48 along the length of the housing 10.

As can be seen in FIG. 4, in consideration with FIG. 3, each cell 48 may be made with an exterior shape being that generally of a rectangular solid and formed of some suitable thermally conductive material. Access openings 50 may be provided as desired and interiorally of each cell 48 is a plurality of fins 52 formed of thermally conductive material which extend to the exterior of the cell 48. A thermal storage salt is introduced into each of the cells 48 through the access openings 50 and will have the characteristics of a melting point within the range of intended operation of the apparatus and a high heat of fusion. For space environments, the salt employed may be lithium fluoride, lithium hydroxide or mixtures thereof.

As intimated by the identification "thermal storage" in describing the salt, the same acts to store or yield thermal energy by phase changes between the solid and liquid phases. Specifically, when the salt changes from the solid phase to the liquid phase, the heat of fusion is taken up or absorbed from the system to be "stored" in the salt. Conversely, when the salt changes from the liquid phase to the solid phase, the heat of fusion of the salt is yielded to the system.

As can be ascertained from FIG. 3, when the salt cells 48 are disposed within the pockets 44, they are in heat exchange relation with an adjacent one of the axial heat pipes 28. Thus, by heat exchange between the salt cells 48 and the axial heat pipes 28, thermal energy may be yielded to the heat pipes 28 or taken from the heat pipes 28 and stored by the salt cells 48.

When operating to receive and absorb solar energy, the system operates as follows. Solar energy impinging on the radially inner surfaces 36 of the axial heat pipes 28 will cause liquid potassium in the wicking material 46 thereat to evaporate. The resulting evaporation of the liquid potassium will cause liquid potassium elsewhere in each axial heat pipe 28 to travel through capillary action produced in the wicking material 46 to the radial inner surface to make up for that which is evaporated.

The vaporized potassium is free to travel throughout each heat pipe and a certain amount of the same will condense on the wicking material 46 lining the side walls 42. This condensation provides heat to the adjacent salt cells 48, that is, is stored in the salt cells 48 as the salt melts. The remainder of the potassium vapor will condense on the radially outer surfaces 34 of the axial heat pipe at cooler regions thereon which generally will be immediately radially inwardly of the heat exchange units 38. The condensation will transfer heat to the working fluid in the tubes 40. The condensed potassium in both cases will wick back to the radially inner surface 36 via the wicking material 46 as is well known.

In the event the various axial heat pipes 28 do not receive equal amounts of energy through the opening 22, the circumferential heat pipes 32 come into play and act to make the apparatus essentially isothermal. In particular, where the axial heat pipes 28 are receiving unequal amounts of thermal energy, those receiving less energy will be cooler than those receiving more. Potassium vapor in the axial heat pipes 28 receiving more of the thermal energy will condense on the radially outer surfaces 34 of such heat pipes in the vicinity of the circumferential heat pipes 32 as well as the other locations previously described. This in turn will yield heat to the circumferential heat pipes 32 resulting in the working fluid therein in the vicinity of the hotter ones of the axial heat pipes 28 being vaporized. Such vaporized working fluid in the circumferential heat pipes 32 is free to travel within such heat pipes and will travel to those portions of the circumferential heat pipes 32 in abutment with the cooler ones of the axial heat pipes 28 to condense thereat and yield heat to such cooler one of the axial heat pipes 28. This in turn will result in the vaporization of the working fluid adjacent the radially outer surfaces 34 of the cooler axial heat pipes 28 and, by the same process described previously, condensation of such vapor in the cooler axial heat pipes to provide heat transfer to those parts of the heat exchangers 38 adjacent the cooler heat pipes 28 as well as salt cells 38 associated therewith. Thus, operation is essentially isothermal about the entirety of the housing 20 even when incoming solar energy is improperly focused to impinge more on one side than another.

When the apparatus is receiving no thermal energy or insufficient energy to keep up with the demand for energy placed on the system by heat transfer to the working fluid 40, the relatively hotter salt cells will cause vaporization of potassium liquid in the wicking material 46 of the sides 42 of the axial heat pipes 28 which then is transferred about the system and ultimately to the heat exchangers 38 in the same manner mentioned previously.

The apparatus may also be utilized as an energy storing device for heat generated elsewhere. In this case, the aperture 22 is dispensed with and heat exchangers (not shown) similar to the heat exchangers 38 are located on the radially inner surfaces 36 of the axial heat pipes 28 to be in heat transfer relation therewith. The heat from the external source will ultimately be transferred to the salt cells 48 for storage and can be retrieved via the heat exchangers 38 in the manner stated previously.

It will be appreciated that the use of a plurality of individual or discrete pipes provides a system which is not subject to catastrophic failure. While the loss of one heat pipe will cause a proportional degradation of the performance of the system, the remainder of the heat pipes will continue to operate in the manner specified previously thereby avoiding a catastrophic failure wherein the entire system becomes inoperative.

I claim:

1. A solar boiler or energy storage device comprising:
   a housing having a generally cylindrical interior wall and including heat receiving means;
   a plurality of elongated axially extending individual first heat pipes in proximity to said interior wall and disposed about the periphery thereof;
   a plurality of circumferentially extending individual second heat pipes in proximity to said wall over a predetermined axial portion thereof and in heat transfer relation with said first heat pipes on the radially outer sides thereof; and
   at least one circumferentially extending heat exchanger in heat transfer relation with said first heat pipes at a location axially spaced from said second heat pipes.

2. The apparatus of claim 1 further including thermal storage salt cells interposed between at least some of said first heat pipes in heat exchange relation therewith.

3. The apparatus of claim 2 wherein said some first heat pipes have generally I-shaped cross sections and said salt cells are disposed on opposite sides thereof and between the top and the base thereof.

4. The apparatus of claim 2 wherein said salt cells have internal thermally conductive fins.

5. The apparatus of claim 1 wherein said second heat pipes are divided into two, axially spaced sets, and said heat exchanger is located between said sets.

6. A solar boiler or energy storage device comprising:
   a housing having a generally cylindrical interior wall and including heat receiving means;
   a plurality of elongated axially extending individual first heat pipes in proximity to said interior wall, said first heat pipes having a generally I-shaped cross section and being disposed about the periphery of said interior wall in side-by-side relation with their tops and bases generally abutting and their sides spaced to define pockets;
   a plurality of circumferentially extending individual second heat pipes in proximity to said wall over a predetermined axial portion thereof and in heat transfer relation with said first heat pipes on the radially outer sides thereof;
   at least one circumferentially extending heat exchanger in heat transfer relation with said first heat pipes at a location axially spaced from said second heat pipes; and
   thermal storage salt cells in said pockets in heat transfer relation with the sides of said first heat pipes defining said pockets.

7. A solar boiler or energy storage device comprising:
   a housing having a generally cylindrical interior wall and including heat receiving means;
   a plurality of discrete, elongated axially extending first heat pipes lining said interior wall;
   two spaced groups, each of a plurality of circumferentially extending second heat pipes, on said wall over spaced predetermined axial portions thereof and in heat transfer relation with said first heat pipes on the radially outer sides thereof; and
   at least one circumferentially extending heat exchanger in heat transfer relation with said first heat pipes at a location between said groups of said second heat pipes.

* * * * *